(12) United States Patent
Millikin

(10) Patent No.: US 9,608,969 B1
(45) Date of Patent: *Mar. 28, 2017

(54) ENCRYPTED AUGMENTATION STORAGE

(71) Applicant: Google Inc., Mountain View, CA (US)

(72) Inventor: John Millikin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/053,665

(22) Filed: Feb. 25, 2016

Related U.S. Application Data

(63) Continuation of application No. 14/145,174, filed on Dec. 31, 2013, now Pat. No. 9,298,942.

(51) Int. Cl.
*G06F 21/62* (2013.01)
*H04L 29/06* (2006.01)
*G06F 12/14* (2006.01)

(52) U.S. Cl.
CPC ...... *H04L 63/0435* (2013.01); *G06F 12/1408* (2013.01); *H04L 63/061* (2013.01); *G06F 2212/1052* (2013.01)

(58) Field of Classification Search
CPC ............ G06F 21/6218; G06F 12/1408; G06F 2212/1052; H04L 63/0442; H04L 63/0435; H04L 63/061
See application file for complete search history.

(56) References Cited

U.S. PATENT DOCUMENTS

| | | |
|---|---|---|
| 5,956,407 A | 9/1999 | Slavin |
| 7,000,119 B1 | 2/2006 | Jia et al. |
| 7,543,336 B2 | 6/2009 | Lampson et al. |
| 7,548,621 B1 | 6/2009 | Smith et al. |
| 7,802,096 B1 | 9/2010 | Matthews et al. |
| 8,086,863 B2 * | 12/2011 | Rits ........................ H04L 9/0825 380/277 |

(Continued)

OTHER PUBLICATIONS

"Adobe Acrobat 7.0 Professional" [online] [Retrieved on Dec. 31, 2013]; Retrieved from http://help.adobe.com/archive/en_US/acrobat/7/professional/ACROHELP.PDF, 2004 Adobe Systems Incorporated, 793 pages.

(Continued)

*Primary Examiner* — Joseph P Hirl
*Assistant Examiner* — Stephen Gundry
(74) *Attorney, Agent, or Firm* — Fish & Richardson P.C.

(57) ABSTRACT

Methods, systems, and apparatus, including computer programs encoded on a computer storage medium, for storing and retrieving encrypted data. In one aspect, a method includes receiving, at a server computer separate from a user device, a first encrypted resource encrypted by use of a public encryption key, wherein the public encryption key is paired with a private encryption key according to an asymmetric encryption key scheme; retrieving, by the server computer, a second encrypted resource encrypted by use of the public key; augmenting, by the server computer, the first encrypted resource with the second encrypted resource to form an encrypted data tuple; encrypting, by the server computer, the encrypted data tuple; and storing, by the server computer, the encrypted data tuple as the second encrypted resource.

12 Claims, 3 Drawing Sheets

(56) References Cited

U.S. PATENT DOCUMENTS

| | | | |
|---|---|---|---|
| 8,533,469 B2 * | 9/2013 | Song | G06F 21/6218 709/225 |
| 8,594,335 B1 * | 11/2013 | Izhar | G06F 21/6218 380/277 |
| 8,819,450 B2 * | 8/2014 | Cherian | G06F 21/64 707/687 |
| 8,914,632 B1 * | 12/2014 | Shankar | H04L 63/101 713/167 |
| 2003/0056108 A1 * | 3/2003 | Mont | G06F 21/6209 713/193 |
| 2004/0175000 A1 | 9/2004 | Caronni | |
| 2004/0240670 A1 * | 12/2004 | Man | G06F 21/6218 380/277 |
| 2004/0267668 A1 * | 12/2004 | Aissi | G06F 21/60 705/50 |
| 2005/0091487 A1 * | 4/2005 | Cross | G06F 21/10 713/165 |
| 2006/0126836 A1 | 6/2006 | Rivas et al. | |
| 2006/0259781 A1 | 11/2006 | Saeki et al. | |
| 2007/0206787 A1 | 9/2007 | Bell et al. | |
| 2008/0019528 A1 | 1/2008 | Kneissler | |
| 2008/0209231 A1 | 8/2008 | Kim et al. | |
| 2008/0235521 A1 * | 9/2008 | Gosselin | G06F 21/6218 713/193 |
| 2008/0253571 A1 | 10/2008 | Rits et al. | |
| 2009/0177894 A1 * | 7/2009 | Orsini | G06F 21/6209 713/193 |
| 2010/0131773 A1 * | 5/2010 | Cherian | G06F 21/64 713/193 |
| 2010/0306547 A1 * | 12/2010 | Fallows | G06F 21/305 713/178 |
| 2011/0126008 A1 * | 5/2011 | Song | G06F 21/6218 713/167 |
| 2011/0145593 A1 | 6/2011 | Auradkar et al. | |
| 2011/0173455 A1 | 7/2011 | Spalka et al. | |
| 2012/0121080 A1 | 5/2012 | Kerschbaum | |
| 2012/0290849 A1 | 11/2012 | Simske et al. | |
| 2013/0191629 A1 | 7/2013 | Treinen et al. | |
| 2013/0191650 A1 | 7/2013 | Balakrishnan et al. | |
| 2013/0305039 A1 | 11/2013 | Gauda et al. | |
| 2014/0013439 A1 * | 1/2014 | Koike | G06F 21/6218 726/26 |
| 2014/0157435 A1 | 6/2014 | Stamos et al. | |
| 2014/0189348 A1 * | 7/2014 | El-Shimi | G06F 21/6218 713/165 |
| 2014/0298037 A1 * | 10/2014 | Xiao | H04L 9/3273 713/181 |
| 2014/0337641 A1 * | 11/2014 | Cherian | G06F 21/64 713/193 |
| 2015/0058629 A1 | 2/2015 | Yarvis et al. | |
| 2015/0117641 A1 | 4/2015 | Carrillo De La Fuente | |

OTHER PUBLICATIONS

Wang et al., "Fast and Secure Append-Only Storage with Infinite Capacity," University of North Carolina at Charlotte, Aug. 27, 2003, 9 pages.

Yavuz et al., "Efficient, Compromise Resilient and Append-only Cryptographic Schemes for Secure Audit Logging," North Carolina State University, Sep. 2011, 16 pages.

* cited by examiner

ENCRYPTED AUGMENTATION STORAGE

CROSS-REFERENCE TO RELATED APPLICATIONS

This application is a continuation application of, and claims priority to, U.S. patent application Ser. No. 14/145,174, titled "ENCRYPTED AUGMENTATION STORAGE," filed on Dec. 31, 2013. The disclosure of the foregoing application is incorporated herein by reference in its entirety for all purposes.

BACKGROUND

This specification relates to storage of encrypted data.

Cloud computing is network-based computing in which typically large collections of servers housed in data centers or "server farms" provide computational resources and data storage as needed to remote end users. Some cloud computing services allow for storage of user data in cloud storage rather than on the users' personal computing devices. Users may be individuals or entities within companies, and thus many different types of data may be stored in the cloud, and the amount of stored data may be very large. Furthermore, various security techniques are implemented in cloud based storage systems.

Some data storage techniques involve an append-only protocol in which users are permitted to add new content but are prohibited from modifying or deleting previously added content. A very common use case for append-only data is in security and audit logging.

SUMMARY

In general, one innovative aspect of the subject matter described in this specification can be embodied in methods that include the actions of receiving, from a user device, a first encrypted resource encrypted by use of a public encryption key, wherein the public encryption key is paired with a private encryption key according to an asymmetric encryption key scheme; retrieving, by a server computer separate from the user device, a second encrypted resource encrypted by use of the public key; augmenting, by a server computer, the first encrypted resource with the second encrypted resource to form an encrypted data tuple; encrypting, by a server computer, the encrypted data tuple, and storing, by the server computer, the encrypted data tuple as the second encrypted resource. Other embodiments of this aspect include corresponding systems, apparatus, and computer programs, configured to perform the actions of the methods, encoded on computer storage devices.

Another innovative aspect of the subject matter described in this specification can be embodied in methods that include the actions of generating, by a user device, a first encrypted resource by use of a public encryption key, wherein the public encryption key is paired with a private encryption key according to an asymmetric encryption key scheme; sending, by the user device, the first encrypted resource to a server separate from the user device; sending, by the user device, a request for a second encrypted resource encrypted by use of the public key, wherein the second encrypted data comprises respective encryptions of first encrypted resources and second encrypted resources, wherein each respective encryption comprises an encryption of an encrypted data tuple of a respective first encrypted resource augmenting a respective second encrypted resource; receiving, by the user device, the second encrypted resource; iteratively decrypting the second resource to decrypt the encrypted data tuples, each decryption iteration done by use of the private encryption key. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The encryption process in combination with an augment-only resource file reduces the susceptibility of data being compromised when a storage system itself is compromised by a malicious process or by an unauthorized party.

For large data sets, encrypted content data files are stored and a corresponding index is stored separately from the encrypted data files. The index is stored according to the secured augment-only scheme. For retrieval, the encrypted index is sent to the requesting user device, where it is decrypted. Then the user device requests one or more encrypted content data files using the decrypted index. Upon receipt at the user device, the encrypted content data files are decrypted. The storage and encryption of the index ensures that unauthorized access to encrypted data files for a particular content set is precluded, and conserves bandwidth between the storage system and the requesting user device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
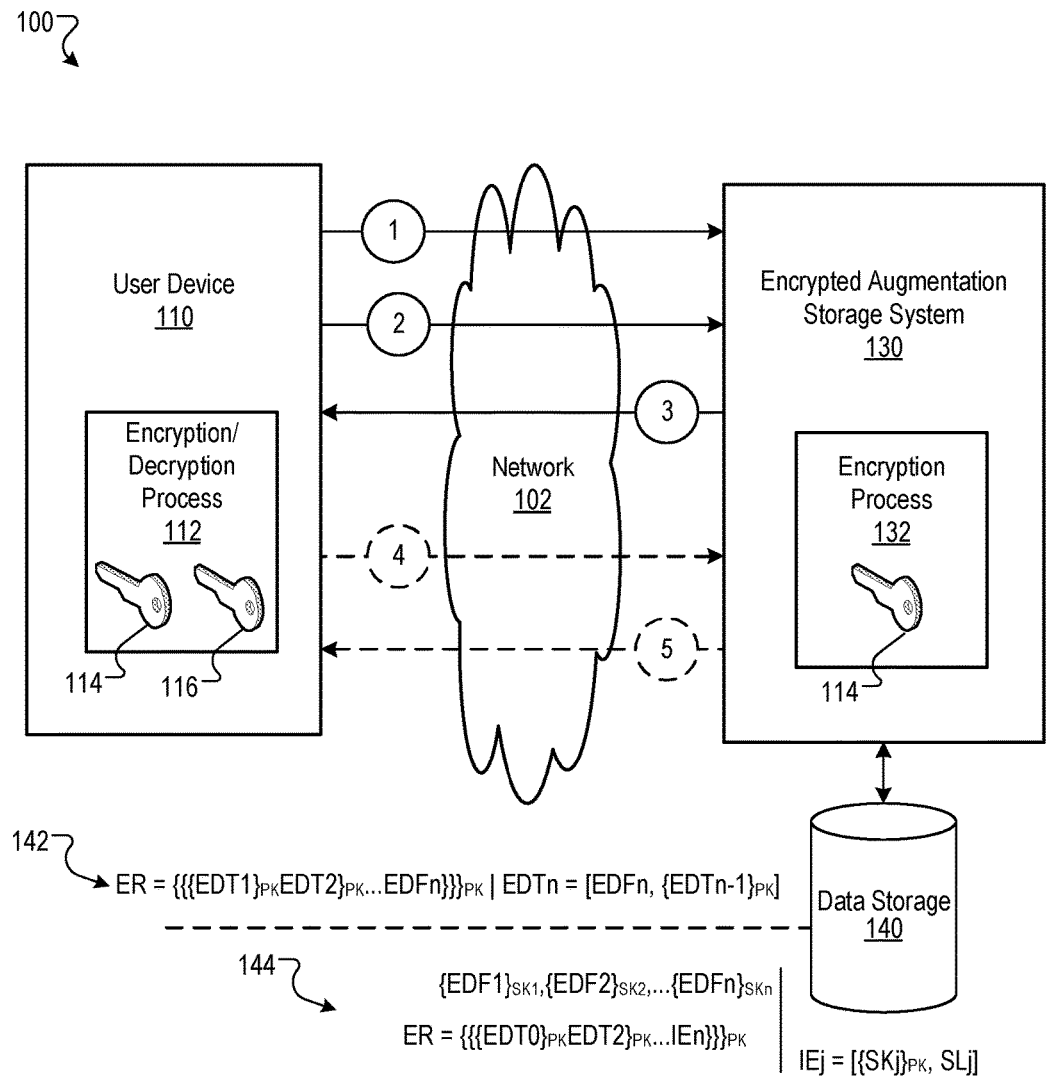
FIG. 1 is a system diagram of an encrypted augmentation storage system.

FIG. 1 is a system diagram of an encrypted augmentation storage system 100. A computer network 102, such as a local area network (LAN), wide area network (WAN), the Internet, or a combination thereof, connects a user device 110 and an encrypted augmentation storage system 130.

The user device 110 is an electronic device that is under the control of a user and is capable of requesting and receiving resources over the network 102. Example user devices 110 include personal computers, mobile communication devices, and other devices that can send and receive data over the network 102. The user device 110 can also include a device that facilitates the process of large amounts of data, such as a server front end for a set of interconnected data processors. Thus, as used in this document, the user device 110 is any computer device that is capable of sending and receiving data over the network 102, and that can be programmed to perform the operations described below.

The encrypted augmentation storage system 130 includes one or more computers that are programmed to encrypt data received from the user device 110 and store the data in a data storage 140 for later retrieval. The encrypted augmentation storage system 130 can be implemented, for example, in a server farm and may have the capability of storing and processing large amounts of data. One example encrypted augmentation storage system 130 is a cloud based storage system.

In operation, the user device 110 employs an encryption/decryption process 112, and the encrypted augmentation storage system 130 employs a counterpart encryption process 132. The user device has a public key 114 and a private key 116, and publishes the public key 114 to the encrypted augmentation storage system 130. The encrypted augmentation storage system 130 stores an encrypted resource (ER), the encrypted resource is provided to the user device 110 each time the user device 110 sends a request to retrieve encrypted data stored at the storage system 130.

As will be described in more detail below, the encrypted augmentation storage system 130 may, in one implementation, store encrypted data files (EDF) in a single encrypted resource (ER) scheme 142 in the data storage. The encrypted resource in this scheme includes all content that was encrypted by the user device 110. This implementation is described with reference to FIG. 2 below.

Figure 3:
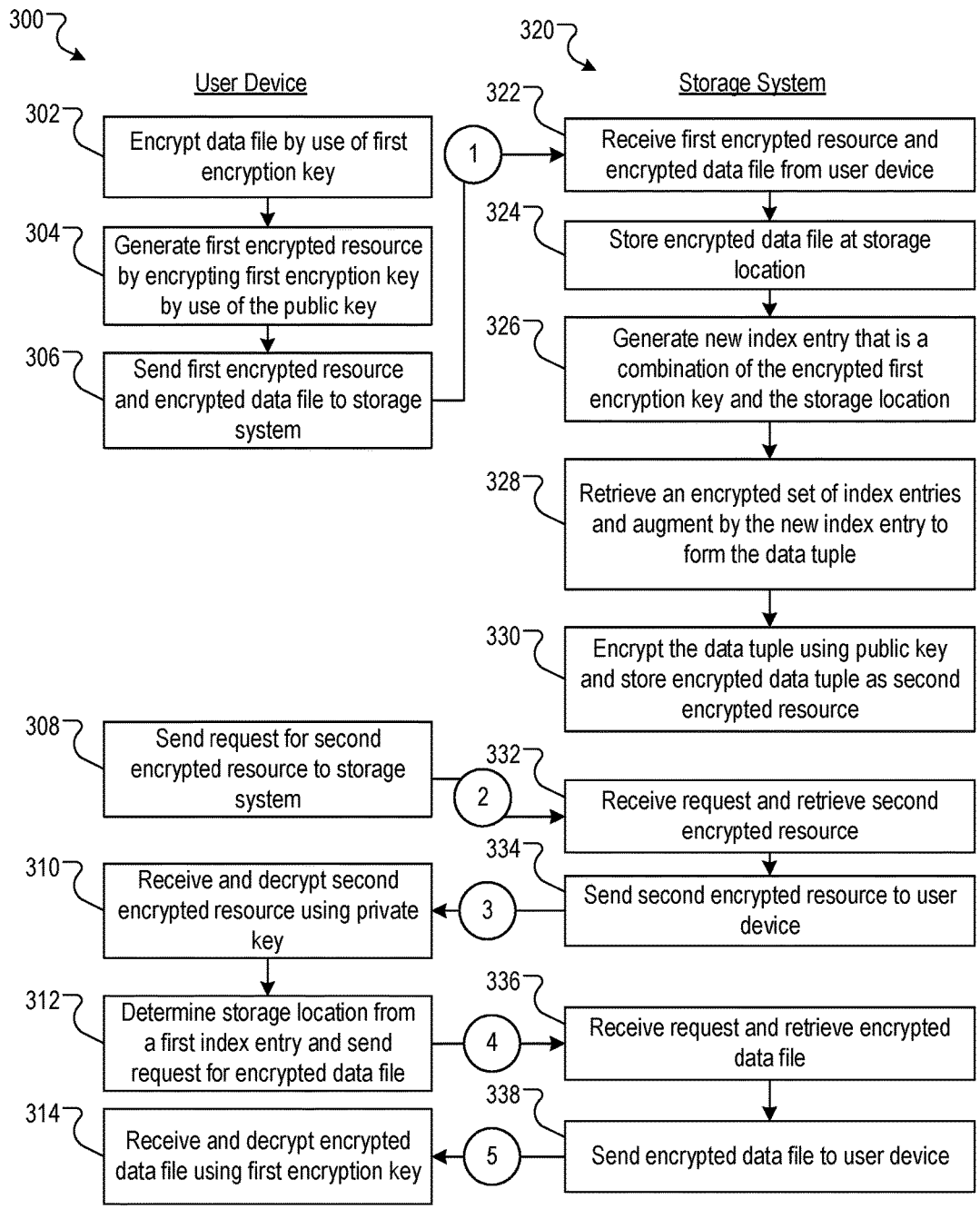
FIG. 3 is a flow diagram of another set of example processes in an encrypted augmentation storage system and a user device.

In a variation of this implementation, the encrypted data files (EDF) may be stored separately from an encrypted resource ER in an encrypted index scheme 144. The encrypted resource is an encrypted index of storage locations (SL) of each encrypted data file, and the encrypted index is provided to the user device 110 when the user device 110 sends a request to retrieve encrypted data. The user device then decrypts the encrypted index, and then accesses the index to request the encrypted data file(s) at the corresponding storage locations. When the encrypted data files are received by the user device 110, the user device then decrypts the encrypted data files. This implementation is described with reference to FIG. 3 below.

Figure 2:
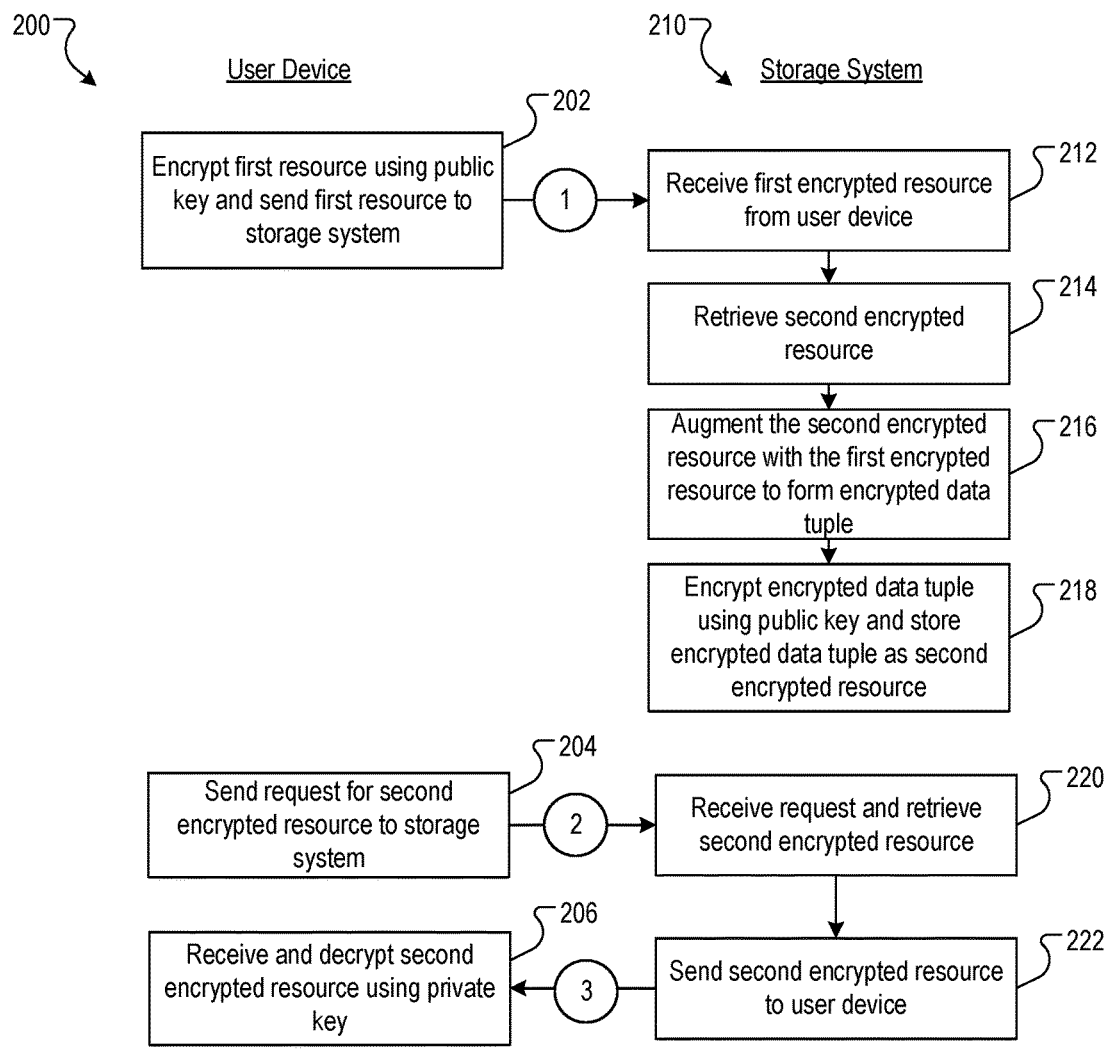
FIG. 2 is a flow diagram of example processes in an encrypted augmentation storage system and a user device.

FIG. 2 is a flow diagram of example processes 200 and 210 in an encrypted augmentation storage system 130 and a user device 110. The process elements 200 below the heading "User Device" are performed in the user device 110, and the process elements 210 below the heading "Storage System" are performed in the encrypted augmentation storage system 130.

The user device encrypts a first resource using a public key and sends the first resource to the storage system (202). For example, as shown in FIGS. 1 and 2, and represented by flow element 1, the user device 110 encrypts a data file using the public key 114. The encrypted data file (EDF) is the first resource and is sent to the encrypted augmentation system 130. Any appropriate public/private key encryption scheme can be used.

The storage system receives the first encrypted resource from the user device (212), and then retrieves a second encrypted resource (214). The second encrypted resource (ER) is a resource that is associated with the public key 114 by virtue of being encrypted by the public key 114. The second encrypted resource is a nested encryption of data tuples, which is described in more detail below. The second encrypted resource, in this implementation, includes all content that was encrypted by the user device 110 by use of the public key 110.

The storage system augments the second encrypted resource with the first encrypted resource to form an encrypted data tuple (216). The augmentation may involve appending or prepending the second encrypted resource with the first encrypted resource. The encrypted data tuple EDT is of the following form:

$$EDTn = [EDFn, \{EDTn-1\}_{PK}]$$

where:
EDFn is the $n^{th}$ encrypted data file received from the user device that was encrypted by the public key 114;
$\{EDTn-1\}_{PK}$ is the n−1 encrypted data tuple encrypted by the public key PK; and
EDTn is the $n^{th}$ encrypted data tuple.

In situations when an encrypted data file is the first data file received that has been encrypted by a particular public key, e.g., EDF1 is received, a null value may be used to represent EDT0, e.g., EDT0=<NULL>.

The storage system encrypts the encrypted data tuple using the public key of the user device and stores the encrypted data tuple as the second encrypted resource (218). For example, assume that the user device 110 has sent three encrypted data files to the encrypted augmentation storage system 130. The first data tuple is:

$$EDT1 = [EDF1, \{NULL\}_{PK}] \text{(or, optionally [EDF1, NULL])}$$

The second encrypted resource that is generated is thus:

$$ER = \{EDT1\}_{PK} = \{[EDF1, NULL]\}_{PK}$$

The second data tuple that is generated in response to the second encrypted data file sent from the user device is:

$$EDT2 = [EDF2, \{EDT1\}_{PK}] = [EDF2, \{[EDF1, NULL]\}_{PK}]$$

The second encrypted resource that is generated is thus:

$$ER = \{EDT2\}_{PK} = \{EDF2, \{EDT1\}_{PK}\}_{PK} = \{EDF2, \{[EDF1, NULL]\}_{PK}\}_{PK}$$

The third data tuple that is generated in response to the third encrypted data file sent from the user device is:

$$EDT3 = [EDF3, \{EDT2\}_{PK}] = [EDF3, \{EDF2, \{EDT1\}_{PK}\}_{PK}] = [EDF3, \{EDF2, \{EDF1, NULL\}_{PK}\}_{PK}]$$

The second encrypted resource that is generated is thus:

$$ER = \{EDT3\}_{PK} = \{EDF3, \{EDT2\}_{PK}\}_{PK} = \{EDF3, \{EDF2, \{EDT1\}_{PK}\}_{PK}\}_{PK} = \{EDF3, \{EDF2, \{EDF1, NULL\}_{PK}\}_{PK}\}_{PK}$$

Although the encrypted resource ER described above is generated from encryptions of appending a prior version of the second encrypted resource to a most recently received encrypted data file, the encrypted resource ER can also be generated by appending the most recently received encrypted data file to the most prior version of the second encrypted resource ER and then encrypting the resulting tuple. The appending scheme is represented by the alternate storage notation for the scheme 142 in FIG. 1.

The user device sends a request for the second encrypted resource to the storage system (204). This request is illustrated by flow element 2 in FIGS. 1 and 2.

The storage system receives the request and retrieves the second encrypted resource (220). The encrypted resource is, in some implementations, identified based on the public key 114. Once the second encrypted resource is retrieved, the storage system sends the second encrypted resource to the user device (222). This is illustrated by flow element 3 in FIGS. 1 and 2.

The user device receives and decrypts the second encrypted resource using a private key (206). For example, the user device 110 iteratively decrypts the second resource to decrypt the encrypted data tuples. Each decryption iteration is done by use of the private encryption key. Recovering the null value during the encryption iteration indicates a complete decryption of the data tuples. Thus, in the example above in which three encrypted data files are stored, the iterative decryption of the second encrypted resource will yield the three encrypted data files EDF1, EDF2, and EDF3. Each data file may then be decrypted by use of the private key.

The implementation described with reference to FIGS. 1 and 2 above thus allows for secure storage of related data files in the cloud. The iterative encryption of the encrypted data in the second encrypted resource provides added security in that an unauthorized party that gains access to the second encrypted resource cannot determine how many constituent data files it contains nor the relative sizes of the data files.

In the alternate implementation, the encrypted data files (EDF) are stored separately from an encrypted resource ER in an encrypted index scheme 144. The encrypted index is the second encrypted resource that is provided to the user device 110 when the user device 110 sends a request to retrieve encrypted data. The user device then decrypts the encrypted index, and then accesses the index to request the encrypted data file(s) at the corresponding storage locations. When the encrypted data files are received by the user device 110, the user device then decrypts the encrypted data files. This scheme is described with reference to FIG. 3, which is a flow diagram of another set of example processes 300 and 310 in an encrypted augmentation storage system and a user device 110. The process elements 300 below the heading "User Device" are performed in the user device 110, and the process elements 320 below the heading "Storage System" are performed in the encrypted augmentation storage system 130.

The user device encrypts a data file by use of a first encryption key (302). The first encryption key may be a public key, or, alternatively, may be a symmetric encryption key generated according to a symmetric encryption scheme. The symmetric encryption key may be the same for each data file that is encrypted, or, alternatively, may be randomly generated for each data file that is encrypted. Any appropriate symmetric key encryption scheme can be used.

The user device generates a first encrypted resource by encrypting the first encryption key by use of a public key (304). For example, after the data file is encrypted, then the first encryption key is encrypted.

The user device sends the first encrypted resource and the encrypted data file to the storage system (306). This is illustrated by flow element 1 of FIGS. 1 and 3. The data file and the encryption key used to encrypt the data file are thus not feasibly accessible by unauthorized users.

The storage system receives the first encrypted resource and the encrypted data file from the user device (322), and the storage system stores the encrypted data file at a storage location (326). Once stored, the storage system has storage location data (SL) describing the storage location of the file and other information, such as file size, date, etc. All such data is represented as storage location (SL) data in FIG. 1. In some implementations, each encrypted data file is stored as data file separate from each other data file, and can be separately accessed by use of the storage location data. This is represented by the encrypted data files $\{EDF1\}_{SK1}$, $\{EDF2\}_{SK2}, \ldots \{EDFn\}_{SKn}$ notation for the scheme 144 in FIG. 1. Each $SK_j$ may represent the same encryption key or a unique encryption key that is used to encrypt a corresponding $j^{th}$ data file EDFj.

The storage system generates a new index entry that is a combination of the encrypted first encryption key and the storage location (328). The index entry (IE) is represented by the combination of the key SK and the storage location SL, e.g., $$IEj=[\{SKj\}_{PK},SL]$$

where:
IE is the $j^{th}$ index entry for the $j^{th}$ encrypted file at the storage location SL;
$\{SKj\}_{PK}$ is the encryption key used to encrypt the $j^{th}$ encrypted data file and is itself encrypted by the public key PK.

The storage system retrieves an encrypted set of index entries and augments the encrypted set by the new index entry to form the data tuple (328). The encrypted set of index entries is the second encrypted resource, and is encrypted in a manner similar to the generation of the tuples as described with reference to FIG. 2 above.

The storage system encrypts the data tuple using the public key of the user device and stores the encrypted data tuple as the second encrypted resource (330). For example, for three encrypted data files, the following data are stored in the data storage 140:

$$\{EDF1\}_{SK1},\{EDF2\}_{SK2},\{EDF3\}_{SK3}$$

$$ER=\{EDT3\}_{PK}=\{IE3,\{EDT2\}_{PK}\}_{PK}=\{IE3,\{IE2,\{EDT1\}_{PK}\}_{PK}\}_{PK}=\{IE3,\{IE2,\{IE1,NULL\}_{PK}\}_{PK}\}_{PK}=\{[\{SK3\}_{PK},SL3],\{[\{SK2\}_{PK},SL2],\{[\{SK1\}_{PK},SL1],NULL\}_{PK}\}_{PK}\}_{PK}$$

The user device sends a request for the second encrypted resource to the storage system (308). This request is illustrated by flow element 2 in FIGS. 1 and 3.

The storage system receives the request and retrieves the second encrypted resource (332). Here, the storage system retrieved the encrypted resource of index entries and encryption keys and then sends the second encrypted resource to the user device (334). This is illustrated by flow element 3 of FIGS. 1 and 3.

The user device receives and decrypts the second encrypted resource using the private key (310). For example, the user device 110 iteratively decrypts the second resource to decrypt the encrypted data tuples. Each decryption iteration is done by use of the private encryption key. Recovering the null value during the encryption iteration indicates a complete decryption of the data tuples. Thus, in the example above in which three encrypted data files are stored and the corresponding index entries are encrypted in the second encrypted resource, the iterative decryption of the second encrypted resource will yield the sequence of three index entries IE1, IE2 and IE3, or $[\{SK3\}_{PK}, SL3]$, $[\{SK2\}_{PK}, SL2]$, $[\{SK1\}_{PK}, SL1]$. Each first encryption keys SK3, SK2 and SK1 may be decrypted by use of the private key at the user device so the user device now has the storage locations of the three encrypted data files in the encrypted augmentation storage system 130 and the corresponding encryption keys that were used to respectively encrypt each file.

The user device determines a storage location from a first index entry and sends a request for the encrypted data file to the storage system (312). For example, assume the user device 110 requests the second encrypted data file EDF2. The user device 110 thus requests the file at SL2, as indicated by the flow element 4 in FIGS. 1 and 3.

The storage system receives the request and retrieves the encrypted data file (336), and then sends the encrypted data file to the user device (338). This is illustrated by the flow element 5 in FIGS. 1 and 3.

The user device receives and decrypts the encrypted data file using first encryption key (314). For example, the user device decrypts the data file EDF2 using the key SK2.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
   receiving, from a user device at a server computer separate from the user device:
   a first encrypted data file of content encrypted by use of a first encryption key; and
   the first encryption key encrypted as a first encrypted key by use of a second encryption key;
   storing the encrypted data file at a storage location in a data store;
   generating an index entry that is a combination of the first encrypted key and the storage location of the first encrypted data file in the data store;
   retrieving, by the server computer, a current version of an encrypted resource encrypted by use of the second encryption key, the encrypted resource being an encrypted set of respective index entries, wherein:
   each respective index entry includes a combination of a respective first encryption key encrypted as a respective first encrypted key and a respective storage location of a respective first encrypted data file encrypted by use of the respective first encryption key;
   each respective index entry has been previously combined with a respective prior version of the encrypted resource that did not include the respective index entry to form a respective encrypted data tuple;
   the respective encrypted data tuple so formed is encrypted by use the second encryption key to form another version of the encrypted resource; and
   a most recent version of the encrypted resource is the current version of the encrypted resource;
   combining, by the server computer, the index entry with the current version of the encrypted resource to form an encrypted data tuple;
   encrypting, by the server computer, the encrypted data tuple by use of the second encryption key; and
   storing, by the server computer, the encrypted data tuple as the current version of the second encrypted resource;
   receiving, from a user device, a request for the encrypted resource;
   providing to the user device the encrypted resource;
   receiving, from the user device, a request for an encrypted data file stored at a storage location specified in the encrypted resource; and
   providing, to the user device, the encrypted data file.

2. The method of claim 1, wherein each first encrypted key is a respective encrypted first symmetric encryption key generated according to a symmetric encryption scheme.

3. The method of claim 2, wherein each respective encrypted first symmetric encryption key is different from each other respective encrypted first symmetric encryption key.

4. The method of claim 2, wherein the second encryption key is a public encryption key.

5. A system, comprising:
   a data processing apparatus; and
   a non-transitory computer readable medium storing instructions executable by the data processing apparatus and that upon such execution cause the data processing apparatus to perform operations comprising:
   receiving, from a user device at a server computer separate from the user device:
   a first encrypted data file of content encrypted by use of a first encryption key; and
   the first encryption key encrypted as a first encrypted key by use of a second encryption key;
   storing the encrypted data file at a storage location in a data store;
   generating an index entry that is a combination of the first encrypted key and the storage location of the first encrypted data file in the data store;
   retrieving, by the server computer, a current version of an encrypted resource encrypted by use of the second encryption key, the encrypted resource being an encrypted set of respective index entries, wherein:

each respective index entry includes a combination of a respective first encryption key encrypted as a respective first encrypted key and a respective storage location of a respective first encrypted data file encrypted by use of the respective first encryption key;

each respective index entry has been previously combined with a respective prior version of the encrypted resource that did not include the respective index entry to form a respective encrypted data tuple;

the respective encrypted data tuple so formed is encrypted by use the second encryption key to form another version of the encrypted resource; and a most recent version of the encrypted resource is the current version of the encrypted resource;

combining, by the server computer, the index entry with the current version of the encrypted resource to form an encrypted data tuple;

encrypting, by the server computer, the encrypted data tuple by use of the second encryption key; and storing, by the server computer, the encrypted data tuple as the current version of the second encrypted resource;

receiving, from a user device, a request for the encrypted resource;

providing to the user device the encrypted resource;

receiving, from the user device, a request for an encrypted data file stored at a storage location specified in the encrypted resource; and providing, to the user device, the encrypted data file.

6. The system of claim 5, wherein each first encrypted key is a respective encrypted first symmetric encryption key generated according to a symmetric encryption scheme.

7. The system of claim 6, wherein each respective encrypted first symmetric encryption key is different from each other respective encrypted first symmetric encryption key.

8. The system of claim 6, wherein the second encryption key is a public encryption key.

9. A non-transitory computer readable medium storing instructions executable by a data processing apparatus and that upon such execution cause the data processing apparatus to perform operations comprising:

receiving, from a user device at a server computer separate from the user device:

a first encrypted data file of content encrypted by use of a first encryption key; and the first encryption key encrypted as a first encrypted key by use of a second encryption key;

storing the encrypted data file at a storage location in a data store;

generating an index entry that is a combination of the first encrypted key and the storage location of the first encrypted data file in the data store;

retrieving, by the server computer, a current version of an encrypted resource encrypted by use of the second encryption key, the encrypted resource being an encrypted set of respective index entries, wherein:

each respective index entry includes a combination of a respective first encryption key encrypted as a respective first encrypted key and a respective storage location of a respective first encrypted data file encrypted by use of the respective first encryption key;

each respective index entry has been previously combined with a respective prior version of the encrypted resource that did not include the respective index entry to form a respective encrypted data tuple;

the respective encrypted data tuple so formed is encrypted by use the second encryption key to form another version of the encrypted resource; and a most recent version of the encrypted resource is the current version of the encrypted resource;

combining, by the server computer, the index entry with the current version of the encrypted resource to form an encrypted data tuple;

encrypting, by the server computer, the encrypted data tuple by use of the second encryption key; and storing, by the server computer, the encrypted data tuple as the current version of the second encrypted resource;

receiving, from a user device, a request for the encrypted resource;

providing to the user device the encrypted resource;

receiving, from the user device, a request for an encrypted data file stored at a storage location specified in the encrypted resource; and providing, to the user device, the encrypted data file.

10. The non-transitory computer readable medium of claim 9, wherein each first encrypted key is a respective encrypted first symmetric encryption key generated according to a symmetric encryption scheme.

11. The non-transitory computer readable medium of claim 10, wherein each respective encrypted first symmetric encryption key is different from each other respective encrypted first symmetric encryption key.

12. The non-transitory computer readable medium of claim 10, wherein the second encryption key is a public encryption key.

\* \* \* \* \*